United States Patent [19]

Darlington et al.

[11] Patent Number: 4,605,545

[45] Date of Patent: Aug. 12, 1986

[54] METHOD FOR PRODUCING SODIUM DITHIONITE

[75] Inventors: William B. Darlington, Wadsworth; Charles H. Hoelscher, Doylestown, both of Ohio

[73] Assignee: PPG Industries, Inc., Pittsburgh, Pa.

[21] Appl. No.: 736,167

[22] Filed: May 20, 1985

[51] Int. Cl.$^4$ .............................................. C01B 17/66
[52] U.S. Cl. ................................................... 423/516
[58] Field of Search ............................... 423/515, 516

[56] References Cited

U.S. PATENT DOCUMENTS

| | | | |
|---|---|---|---|
| 1,477,130 | 12/1923 | Kuhne et al. | |
| 2,084,651 | 6/1937 | Mecklenburg et al. | 423/516 |
| 2,172,275 | 9/1939 | Dehnert | 23/116 |
| 2,204,476 | 6/1940 | Dorph | 423/516 |
| 2,576,769 | 11/1951 | Avedikian | 423/516 |
| 2,773,740 | 12/1956 | Battarra et al. | 23/116 |
| 2,938,771 | 5/1960 | Avedikian | 23/116 |
| 2,938,773 | 5/1960 | Kooistra | 23/283 |
| 4,100,098 | 7/1978 | Magan | 252/188 |

FOREIGN PATENT DOCUMENTS

| | | | |
|---|---|---|---|
| 500485 | 2/1939 | United Kingdom | 423/516 |
| 786212 | 11/1957 | United Kingdom | 423/516 |

OTHER PUBLICATIONS

Formation of Sodium Dithionite From Sodium Amalgam and Sulfur Dioxide in Nonaqueous Media, Robert G. Rinker et al, 8, 338–347 (1969) (I&EC Product Research and Development).

*Primary Examiner*—Gary P. Straub
*Attorney, Agent, or Firm*—Bruce H. Cottrell

[57] ABSTRACT

Disclosed is a process of producing anhydrous sodium dithionite by contacting sulfur dioxide-containing formamide and sodium amalgam, separating a sodium dithionite-containing formamide solution from the sodium amalgam and precipitating anhydrous sodium dithionite from the product formamide solution by mixing the sodium dithionite-containing formamide solution with isopropanol, n-propanol, gamma-butyrolactone, tetrahydrofuran or N-methyl-2-pyrrolidone. The sulfur dioxide may be contacted countercurrently with the sodium amalgam in a continuous process. A neutralizing agent can optionally be added to the sodium dithionite-containing formamide solution separated from the amalgam to reduce acidic decomposition of the sodium dithionite.

20 Claims, No Drawings

METHOD FOR PRODUCING SODIUM DITHIONITE

BACKGROUND OF THE INVENTION

The present invention relates to a method of producing sodium dithionite, commonly known as sodium hydrosulfite. More particularly, this invention relates to the preparation of anhydrous sodium dithionite by the reaction of sulfur dioxide and sodium amalgam in formamide solvent.

Sodium dithionite is commonly used as a reducing agent with principal uses in the vat dying of textiles and in the bleaching of wood pulp. Various processes have been developed for producing sodium dithionite either in the form of a solution or as an anhydrous salt. These include a formate process illustrated by U.S. Pat. No. 3,576,598, a zinc process illustrated by U.S. Pat. No. 2,226,576, aqueous amalgam processes illustrated by U.S. Pat. Nos. 2,938,771 and 4,100,098, and non-aqueous amalgam processes illustrated by British Pat. No. 786,212 and Rinker et al., I and E C Prod. Res. and Dev., Vol. 8, pp. 338–347 (1969).

Production of sodium dithionite by either aqueous or non-aqueous amalgam processes has often suffered from mercury contamination of the solid product. This has resulted from dispersion of mercury and/or amalgam particles in the aqueous or non-aqueous media and subsequent contamination of the solid product.

Rinker et al. describe the production of sodium dithionite by contacting sulfur dioxide in a non-aqueous solvent with sodium amalgam. The non-aqueous solvent is selected from among dimethylformamide, dimethyl sulfoxide and formamide. Formamide is found to eliminate dispersion of the sodium amalgam. Sodium dithionite prepared in formamide may be precipitated by the addition of dimethylformamide or acetone to the sodium dithionite-formamide solution. While yields of sodium dithionite on the order of 90 percent and 80 percent may be expected using dimethylformamide and dimethyl sulfoxide respectively, the yield of sodium dithionite using formamide as the solvent is usually less than 65 percent.

Solid, anhydrous sodium dithionite is relatively more stable than either the hydrated salt or an aqueous sodium dithionite solution. Aqueous sodium dithionite solutions are decomposed by acidic conditions. Such decomposition and the cost of transporting the aqueous solutions have dictated that sodium dithionite solutions be produced in relative proximity to the ultimate consumer. There is, therefore, a need for a stable solid sodium dithionite which would facilitate a wider geographical distribution of sodium dithionite.

DESCRIPTION OF THE INVENTION

The present invention provides an improved process for producing anhydrous sodium dithionite. The process includes reacting a sulfur dioxide-containing formamide solution and sodium amalgam, separating a product formamide solution containing sodium dithionite from the sodium amalgam, precipitating anhydrous sodium dithionite from the product formamide solution by mixing with a precipitating agent selected from the group consisting of isopropanol, tetrahydrofuran, n-propanol, gammabutyrolactone and N-methyl-2-pyrrolidone and recovering the precipitated anhydrous sodium dithionite. A neutralizing agent can be added to the product formamide solution simultaneously with the precipitating agent.

A continuous process of producing anhydrous sodium dithionite in accordance with the present invention comprises contacting a sulfur dioxide-containing formamide solution countercurrently with sodium amalgam in a reaction zone. The product formamide solution containing sodium dithionite is passed to a precipitating zone and mixed with the precipitating agent selected from the group consisting of isopropanol, tetrahydrofuran, n-propanol, gamma-butyolactone and N-methyl-2-pyrrolidone to precipitate anhydrous sodium dithionite. A neutralizing agent can be added with the precipitating agent. The precipitated anhydrous sodium dithionite product is separated from the formamide and the precipitating agent by filtration. After the product is separated, the formamide can be separated from the precipitating agent and recycled to the reaction zone. The sodium amalgam may be recycled to the mercury cathode of a sodium halide or sodium hydroxide electrolysis cell.

DETAILED DESCRIPTION OF THE INVENTION

In the present invention, sodium amalgam is contacted with a sulfur dioxide-containing formamide solution in a reaction zone. A product formamide solution containing sodium dithionite is withdrawn from the reaction zone. Anhydrous sodium dithionite is then precipitated from the formamide solution by admixture with a precipitating agent selected from the group consisting of isopropanol, tetrahydrofuran, n-propanol, gammabutyrolactone and N-methyl-2-pyrrolidone followed by recovery of the solid anhydrous product.

Formamide is the preferred solvent. While sodium dithionite is soluble in formamide, neither sodium amalgam nor mercury readily disperse in formamide. Sodium dithionite remains in solution as it forms. The product formamide solution containing sodium dithionite is subsequently separated from the amalgam. By avoiding dispersion of mercury and sodium amalgam and by avoiding contact between solid sodium dithionite and the amalgam, mercury or amalgam contamination of the product is minimized.

The precipitating agent is miscible with formamide and results in precipitation of the anhydrous sodium dithionite from the product formamide solution. The precipitating agent is a liquid which can be easily separated from the formamide solution to allow for convenient recycling. The precipitating agent can have a lower boiling point than the formamide solvent for convenient separation. Suitably, the precipitating agent is selected from the group consisting of isopropanol, n-propanol, gamma-butyolactone, tetrahydrofuran, and N-methyl-2-pyrrolidone. Formamide has a boiling point of about 180° C. Isopropanol, tetrahydrofuran, and n-propanol have boiling points of under 90° C. and are preferred. The product formamide solution can be added to the precipitating agent to effect precipitation of the sodium dithionite or vice versa. The volume ratio between the formamide solution and the precipitating agent can vary from one to one (1:1) up to four to one (4:1). Preferable volume ratios are about one and a half to one (1.5:1).

Sodium amalgam is a by-product of the electrolysis of an aqueous solution of sodium hydroxide or sodium halide, e.g., sodium chloride, utilizing a mercury cathode and a suitable anode, for example a platinum or a ruthenium oxide-coated titanium anode. The sodium content in the amalgam produced by this process is usually from 0.1 to 0.6 weight percent or 0.15 to 0.3 milliequivalents per gram [meq/g]. Preferably, the amalgam contacted with the formamide and sulfur dioxide contains from 0.1 to 0.4 weight percent of sodium.

The initial sulfur dioxide concentration in the formamide solvent contacted with the amalgam is optimally equivalent to a targeted final sodium dithionite concentration in the product formamide solution. The targeted concentration of the sodium dithionite-containing formamide solution should not exceed the saturation point of the sodium dithionite. Otherwise, the salt will crystallize out before the product formamide solution is separated from the sodium amalgam in the reaction zone thereby resulting in mercury contamination of the sodium dithionite salt. The sodium dithionite concentration in the product formamide solution suitably is between 70 and 95 percent of the saturation point, preferably about 85 percent. This equates to concentrations of about 40 to 50 grams per liter at a temperature of about 5° C. The operating temperature used in the process of this invention can be varied over wide ranges. Generally, the temperature can range from about 0° to 50° C., with a preferred range of 5° to 25° C.

In one embodiment, the formamide solution can be passed through a microfilter after being removed from the reaction zone to further reduce mercury concentration to less than 0.5 mg/l. The microfilter may be composed of polytetrafluoroethylene (PTFE) and typically will have a pore size of 0.2 to 0.5 microns. Alternatively, residual entrained mercury can be precipitated by reaction with sulfide, e.g., sodium sulfide, and filtered to obtain sodium dithionite of reduced mercury content.

The preparation of anhydrous sodium dithionite may be conducted by either a batch or continuous process. In the batch process a reactor vessel is charged with the sodium amalgam and formamide. The formamide serves as a solvent for both the sulfur dioxide reactant and the sodium dithionite product. Sulfur dioxide can be added by bubbling gaseous sulfur dioxide into the reaction mixture thereby forming a sulfur dioxide-containing formamide solution in situ, or by adding a preformed solution of sulfur dioxide in formamide. The reaction vessel is stirred and maintained at the desired operating temperature for a period of time sufficient to react the sulfur dioxide and sodium amalgam. Generally, a sufficient period of time can be from 20 to 240 minutes. After completion of the reaction, the product formamide solution containing dissolved sodium dithionite is separated from the depleted amalgam and passed through a PTFE microfilter to remove any residual sodium amalgam or elemental mercury. The sodium dithionite is then precipitated from the product formamide solution by mixing with the precipitating agent.

The precipitating agent can contain a neutralizing agent to react with any residual acid formed by the sulfur dioxide solution. Acidic conditions are preferably avoided to prevent decomposition of the sodium dithionite. The neutralizing agent can be an alkali hydroxide such as sodium hydroxide or potassium hydroxide. The neutralizing agent can be admixed with the precipitating agent and added as a bi-component system. Otherwise, the neutralizing agent can be dissolved in methanol and added with the precipitating agent as a tri-component system.

Following precipitation of the sodium dithionite, the solid product can be separated and recovered from the solution by any suitable solid-liquid separating means, such as filtration or centrifugation.

A continuous process for the production of anhydrous sodium dithionite may comprise contacting sodium amalgam and a sulfur dioxide-containing formamide solution countercurrently in a suitable column or reaction zone. The sulfur dioxide can be introduced into the column as a gas or as a solution of sulfur dioxide in formamide.

The reaction zone can be a column containing a packed bed such as an elutriation column. The sodium amalgam can be introduced at the top of the reaction zone or column and dispersed downwardly through the upwardly flowing sulfur dioxide-containing formamide solution. The sulfur dioxide can be bubbled upwardly through the formamide in the column thereby forming a sulfur dioxide-formamide solution in situ, or a preformed solution of sulfur dioxide in formamide can be passed upwardly through the column. The column can be packed with glass beads, ceramic saddles or other electrically insulating media. The column should not be packed with electrically conducting particles, since they can act as electrolytic depolarizers and catalyze the reaction of formamide with the sodium amalgam.

In the continuous process, the sodium amalgam and sulfur dioxide-containing formamide solution can be contacted during a single pass through the column or the formamide solution can be recycled through the column until the sodium dithionite concentration within the product formamide solution reaches a desired level. The molar quantity of the sodium in the sodium amalgam in the column should exceed the molar concentration of the sulfur dioxide in the column preferably by at least 10 mole percent. After the reaction of the sulfur dioxide and the sodium amalgam is completed, whether in a single pass or multiple passes through the column, the product formamide solution is withdrawn from the column and passed through a polytetrafluoroethylene microfilter having a pore size of 0.2 to 0.5 microns to remove residual sodium amalgam or elemental mercury and then is passed into a sodium dithionite recovery zone, e.g., a precipitation zone.

The product sodium dithionite-containing formamide solution may be introduced into a precipitation vessel containing the precipitating agent or alternatively the product formamide solution can be charged to the precipitation vessel and the precipitating agent added to it. The precipitating agent can contain a neutralizing agent. The precipitating agent and the neutralizing agent can be added as a bi-component system or can include a third component such as methanol.

In a single pass system, the depleted sodium amalgam is collected from the reaction column and forwarded to the mercury cathode of a sodium halide, e.g., sodium chloride, or a sodium hydroxide electrolysis cell to replenish the sodium content of the sodium amalgam. Regenerated and make-up sodium amalgam from the electrolysis cell is forwarded to the reaction column. In a multi-pass system, the sodium amalgam can be recycled directly to the reaction column without passing to the cathode of the electrolysis cell. When the sodium amalgam reaches a depleted sodium content of between 0.01 and 0.1 weight percent, it is recycled through the mercury cathode of the electrolysis cell to replenish the sodium content of the sodium amalgam.

Following precipitation of the sodium dithionite from the formamide solution, the formamide solvent and precipitating agent are separated from the sodium dithionite crystals by filtration or centrifugation. The formamide is then separated from the precipitating agent and neutralizing agent, if used, by fractional distillation or other suitable means. The formamide can then be replenished with additional sulfur dioxide and recycled to the reaction column. Recovered neutralizing agent and precipitating agent may be recycled to the precipitating chamber following separation from the formamide.

The solid, anhydrous sodium dithionite crystals recovered from this amalgam process typically have a mercury content of less than 0.5 parts per million (ppm) parts of sodium dithionite. The product is high assay, high purity anhydrous sodium dithionite. Assays of the product made by the present invention have been analyzed at over 80 percent sodium dithionite.

In the continuous process, the production rate is proportional to the feed rate of sulfur dioxide provided the sodium amalgam is maintained in excess. The amount of sodium amalgam dispersed downward through the reactor does not show a great effect on the yield of product as long as the sodium in the sodium amalgam exceeds the amount of sulfur dioxide in the reactor, preferably by at least 10 mole percent.

The present invention is illustrated by the following examples which are illustrative only.

EXAMPLE I

A formamide solution weighing 136.1 grams and containing 3.36 milliequivalents (meq) of sulfur dioxide ($SO_2$) per gram of solution was added dropwise to a reactor vessel containing 3485 grams of sodium amalgam and 459 grams of formamide. The sodium amalgam contained 0.176 meq of sodium per gram of amalgam. The reaction vessel was maintained at 5° C. for 107 minutes with stirring. The amalgam was then separated from the formamide solution and analyzed as containing 0.0439 meq of Na per gram. The product formamide solution was analyzed and found to contain 0.500 meq of sodium dithionite per gram of solution (about 49 grams per liter). This corresponded to a yield of 62 percent sodium dithionite based on the sodium and the sulfur dioxide consumed. The formamide solution was mixed incrementally with an equal volume of isopropanol. Added with the isopropanol was 11.25 grams total of 1.88 Normal (N) potassium hydroxide in methanol. The formamide-isopropanol mixture was centrifuged and the supernatent liquid decanted to separate the solid product. The solids were twice slurried with isopropanol, centrifuged and decanted. The solids were washed twice with methanol, then dried at room temperature, first under a stream of dry nitrogen gas and then under a vacuum of about 3 Torr. The final solid product of anhydrous sodium dithionite weighed 23.48 grams and was assayed as containing 82 percent $Na_2S_2O_4$.

EXAMPLE II

A column (30 inches in height and 1 inch in diameter) was packed with glass beads of 5 mm diameter to form an elutriation column. Sodium amalgam containing 0.325 weight percent sodium was introduced at the top of the column and dispersed downwardly at a rate of 88 milliliters per minute through formamide being pumped upwardly through the column at a rate of 11 milliliters per minute. Sulfur dioxide was fed into the formamide at the base of the column at a rate of 0.31 grams per minute. The temperature within the column was maintained at 5° C. An overhead product formamide solution containing sodium dithionite was withdrawn and passed through a 0.5 micron PTFE microfilter to remove residual sodium amalgam or elemental mercury. The product formamide solution was analyzed and found to contain 42.4 grams sodium dithionite per liter. This corresponded to a yield of 96 percent sodium dithionite based on the sulfur dioxide consumed. The formamide solution was introduced into a precipitation vessel and mixed simultaneously with an equal volume solution of 5 grams per liter (gpl) potassium hydroxide in isopropanol. The formamide liquor above the precipitated sodium dithionite within the precipitation vessel was analyzed as containing 5.9 grams per liter sodium dithionite. The precipitated anhydrous sodium dithionite crystals were separated from the formamide-isopropanol slurry by filtration, washed with three volumes of isopropanol, and dried first in a stream of dry nitrogen gas and then under a vacuum of less than 3 Torr. The final dried product was analyzed and found to contain 64.3 percent sodium dithionite.

EXAMPLE III

A column (30 inches in height and 1 inch in diameter) was packed with glass beads of 5 mm diameter to form an elutriation column. Sodium amalgam containing 0.356 weight percent sodium was introduced at the top of the column and dispersed downwardly at a rate of 88 milliliters per minute. Formamide was pumped upwardly through the column at a rate of 10 milliliters per minute. Sulfur dioxide was fed into the liquid formamide at the base of the column at a rate of 0.55 grams per minute. The temperature in the column was maintained at 7° C. The average retention time of the formamide passing upwardly through the column was 25 minutes. An overhead formamide solution was withdrawn and passed through a 0.5 micron PTFE microfilter to remove residual sodium amalgam or elemental mercury. The product formamide solution was analyzed and found to contain 43.0 grams per liter sodium dithionite. This corresponded to a yield of 86.3 percent sodium dithionite based on sulfur dioxide consumed. The product formamide solution was introduced into a precipitation vessel and mixed simultaneously with an equal volume solution of 5 gpl potassium hydroxide in isopropanol. The precipitated anhydrous sodium dithionite crystals were separated from the formamide-isopropanol slurry by filtration, washed with three volumes of isopropanol, and dried first in a stream of dry nitrogen gas and then under a vacuum of less than 3 Torr. The yield of solid sodium dithionite was 86 percent based on the amount of sodium dithionite in the solution. The final dried product was assayed and found to contain 79.9 percent sodium dithionite, 3.1 percent sodium thiosulfite and 18.1 percent sodium sulfite.

Obviously, many modifications and variations of the present invention are possible in light of the above teachings. It is therefore to be understood that, within the scope of the appendant claims, the invention may be practiced otherwise than as specifically described.

We claim:

1. In the process of producing anhydrous sodium dithionite by reacting a sulfur dioxide-containing formamide solution and sodium amalgam in a reaction vessel, separating a product formamide solution containing sodium dithionite from the sodium amalgam and precipitating sodium dithionite from such formamide solution by mixing a precipitating agent with such solution, the improvement wherein the precipitating agent is selected from the group consisting of isopropanol and n-propanol.

2. The process of claim 1 wherein the precipitating agent further includes a neutralizing agent selected from the group consisting of potassium hydroxide and sodium hydroxide.

3. The process of claim 1 wherein the precipitating agent is isopropanol.

4. The process of claim 3 wherein the precipitating agent further includes a neutralizing agent selected from the group consisting of potassium hydroxide and sodium hydroxide.

5. A continuous process for the production of anhydrous sodium dithionite comprising:
   (a) contacting a sulfur dioxide-containing formamide solution with sodium amalgam countercurrently in a reaction zone;
   (b) withdrawing a product formamide solution containing sodium dithionite from the reaction zone;
   (c) mixing product formamide solution with a precipitating agent in a precipitation vessel selected from the group consisting of isopropanol and n-propanol thereby to precipitate anhydrous sodium dithionite; and
   (d) separating precipitated anhydrous sodium dithionite from the precipitating agent and formamide.

6. The process of claim 5 wherein the precipitating agent further includes a neutralizing agent selected from the group consisting of potassium hydroxide and sodium hydroxide.

7. The process of claim 5 wherein the precipitating agent is isopropanol.

8. The process of claim 8 wherein the precipitating agent further includes a neutralizing agent selected from the group consisting of potassium hydroxide and sodium hydroxide.

9. The process of claim 8 further comprising separating the formamide from the precipitating agent and the neutralizing agent, recycling the formamide to the reaction zone, recycling the precipitating agent and the neutralizing agent to the precipitation vessel, and forwarding depleted sodium amalgam to a mercury cathode of a sodium halide or sodium hydroxide electrolysis cell, whereby the sodium content of the sodium amalgam is replenished.

10. The process of claim 7 further comprising separating the formamide from the precipitating agent, recycling the formamide to the reaction zone, recycling the precipitating agent to the precipitation vessel, and forwarding the depleted sodium amalgam to a mercury cathode of a sodium halide or sodium hydroxide electrolysis cell, whereby the sodium content of the sodium amalgam is replenished.

11. In a process of producing anhydrous sodium dithionite by reacting a sulfur dioxide-containing formamide solution and sodium amalgam in a reaction vessel, separating a product formamide solution containing sodium dithionite from the sodium amalgam and precipitating sodium dithionite from such formamide solution by mixing a precipitating agent with such solution, the improvement wherein the precipitating agent is selected from the group consisting of gamma-butyrolactone, tetrahydrofuran and N-methyl-2-pyrrolidone.

12. The process of claim 11 wherein the precipitating agent further includes a neutralizing agent selected from the group of sodium hydroxide and potassium hydroxide.

13. The process of claim 11 wherein the precipitating agent is tetrahydrofuran.

14. The process of claim 13 wherein the precipitating agent further includes a neutralizing agent selected from the group of sodium hydroxide and potassium hydroxide.

15. A continuous process for the production of anhydrous sodium dithionite comprising:
   (a) contacting a sulfur dioxide-containing formamide solution with sodium amalgam countercurrently in a reaction zone;
   (b) withdrawing a product formamide solution containing sodium dithionite from the reaction zone;
   (c) mixing product formamide solution in a precipitation vessel with a precipitating agent selected from the group consisting of tetrahydrofuran, gamma-butyrolactone and N-methyl-2-pyrrolidone thereby to precipitate anhydrous sodium dithionite, and
   (d) separating precipitated anhydrous sodium dithionite from the precipitating agent and formamide.

16. The process of claim 15 wherein the precipitating agent is tetrahydrofuran.

17. The process of claim 16 wherein the precipitating agent further includes a neutralizing agent selected from the group of sodium hydroxide and potassium hydroxide.

18. The process of claim 15 wherein the precipitating agent further includes a neutralizing agent selected from the group of sodium hydroxide and potassium hydroxide.

19. The process of claim 16 further comprising separating the formamide from the precipitating agent and the neutralizing agent, recycling the formamide to the reaction zone, recycling the precipitating agent and the neutralizing agent to the precipitation vessel, and forwarding depleted sodium amalgam to a mercury cathode of a sodium halide or sodium hydroxide electrolysis cell, whereby the sodium content of the sodium amalgam is replenished.

20. The process of claim 15 further comprising separating the formamide from the precipitating agent, recycling the formamide to the reaction zone, recycling the precipitating agent to the precipitation vessel, and forwarding the depleted sodium amalgam to a mercury cathode of a sodium halide or sodium hydroxide electrolysis cell, whereby the sodium content of the sodium amalgam is replenished.

* * * * *